(12) United States Patent
Lee

(10) Patent No.: US 9,030,323 B2
(45) Date of Patent: May 12, 2015

(54) METHOD AND APPARATUS FOR DETECTING POSITION

(75) Inventor: Moon-sang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 11/934,807

(22) Filed: Nov. 5, 2007

(65) Prior Publication Data

US 2008/0266097 A1    Oct. 30, 2008

(30) Foreign Application Priority Data

Apr. 24, 2007  (KR) .................. 10-2007-0040054

(51) Int. Cl.
| G08B 13/14 | (2006.01) |
| H04Q 5/22 | (2006.01) |
| G06Q 10/00 | (2012.01) |
| G06F 19/00 | (2011.01) |
| G01S 3/02 | (2006.01) |
| H04B 17/00 | (2006.01) |

(52) U.S. Cl.
CPC ............ *H04B 17/0072* (2013.01); *H04B 17/27* (2015.01)

(58) Field of Classification Search
USPC ..................................................... 340/572.4
See application file for complete search history.

(56) References Cited

U.S. PATENT DOCUMENTS

| 5,920,287 | A * | 7/1999 | Belcher et al. ................ 342/450 |
| 6,332,098 | B2 * | 12/2001 | Ross et al. .................... 700/226 |
| 6,496,806 | B1 * | 12/2002 | Horwitz et al. ................ 705/28 |
| 6,600,418 | B2 * | 7/2003 | Francis et al. ............. 340/572.1 |
| 6,669,089 | B2 * | 12/2003 | Cybulski et al. .............. 235/385 |
| 6,816,075 | B2 * | 11/2004 | Grunes et al. .............. 340/572.1 |
| 6,825,766 | B2 * | 11/2004 | Hewitt et al. ............. 340/572.7 |
| 7,151,445 | B2 * | 12/2006 | Medve et al. ............ 340/539.15 |
| 7,557,703 | B2 * | 7/2009 | Yamada et al. ............ 340/539.1 |
| 2003/0236590 | A1 * | 12/2003 | Park et al. ..................... 700/245 |
| 2007/0136152 | A1 * | 6/2007 | Dunsker et al. ................. 705/28 |

FOREIGN PATENT DOCUMENTS

| JP | 2004069331 A | 3/2004 |
| JP | 3118790 U | 2/2006 |
| JP | 2006133128 A | 5/2006 |
| KR | 10-2003-0095492 A | 12/2003 |
| KR | 10-0631150 B1 | 12/2005 |
| KR | 1020070014537 A | 2/2007 |

OTHER PUBLICATIONS

Communication dated Jun. 25, 2013, issued by the Korean Intellectual Property Office in counterpart Korean Application No. 10-2007-0040054.

* cited by examiner

*Primary Examiner* — Jennifer Mehmood
*Assistant Examiner* — John Mortell
(74) *Attorney, Agent, or Firm* — Sughrue Mion, PLLC

(57) ABSTRACT

Provided are a method and apparatus for detecting a position of an object using radio frequency identification (RFID). The method includes calculating a position of a moving object using a first RFID tag installed at a particular position in a predetermined space while the moving object is moving, sensing a second RFID tag included in the object, determining the position of the object as the position calculated at a point of time when the RFID tag included in the object is sensed, and displaying the determined position.

14 Claims, 6 Drawing Sheets

| OBJECT LIST VIEW | |
|---|---|
| REMOTE CONTROLLER | SAMSUNG DTV REMOTE CONTROLLER |
| KEY | AUTOMOBILE KEY |
| CELLULAR PHONE | SAMSUNG ANYCALL, DAD'S CELLULAR PHONE |
| ⋮ | ⋮ |

METHOD AND APPARATUS FOR DETECTING POSITION

CROSS-REFERENCE TO RELATED PATENT APPLICATION

This application claims priority from Korean Patent Application No. 10-2007-0040054, filed on Apr. 24, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to detecting a position of an object, and more particularly, to detecting a position of an object using radio frequency identification (RFID).

2. Description of the Related Art

When small objects, such as a television (TV) remote controller or an automobile key, fall into a slot between sofa cushions or under a table, it is not easy to find these objects when they are needed. Also, as time goes by, it is easy to forget which book is on which shelf and it can be a waste of time to search for the book without knowing where it is.

However, RFID can help find lost items. The RFID is a recognition technology which senses information about an object and surrounding circumstances by using a wireless communication technology, provided that an electronic tag is affixed to the object. The RFID is a technology which stores identifier (ID) information in an electronic memory device called an RFID tag and transmits ID information using an RF wireless technology, and an RFID system includes the RFID tag, an RFID reader, and a host supporting the RFID reader. The RFID tag includes a memory and an antenna, which transmits information stored in a memory to the RFID reader. The RFID tag can be classified into a passive type and an active type according to a power supply method, where the passive RFID tag generates a power using an electric wave from the RFID reader and the active RFID tag has its own power supply.

A basic principle of operation is that an antenna of an RFID tag and an antenna of an RFID reader transmit and receive data by communicating using frequencies. When the antenna built into the RFID tag receives a frequency from the RFID reader, an integrated circuit (IC) chip built into the RFID tag operates, transforms information in the IC chip into a signal, and transmits the signal through the antenna of the RFID tag. The RFID reader then receives the transmitted signal through the antenna and the received information is transmitted to a server by a wired/wireless communication method.

However, when finding an object using the RFID tag and the RFID reader, the user has to carry the RFID reader for scanning so as to find the object.

SUMMARY OF THE INVENTION

The present invention provides a method and apparatus for detecting a position of objects in a room or for finding lost objects, by using RFID.

The present invention also provides a computer readable recording medium having recorded thereon a program for the above described method.

According to an aspect of the present invention, there is provided a method of detecting a position of an object using a moving object, the method including calculating a position of the moving object using a first RFID tag installed at a position in a predetermined space; sensing a second RFID tag included in the object; and determining the position of the object based on the position of the moving object calculated at a point of time when the second RFID tag is sensed.

According to another aspect of the present invention, there is provided a method of detecting a position of an object using a moving object, the method including receiving input information related to the object from a user; sensing an RFID tag included in the object while the moving object is moving; and informing the user that the object is detected if information stored in the sensed RFID tag corresponds to the received input information.

According to another aspect of the present invention, there is provided a computer readable medium having embodied thereon a computer program for the above method.

According to an aspect of the present invention, there is provided an apparatus for detecting a position of an object using a moving object, the apparatus including: a control unit which calculates a position of the moving object using a first RFID tag installed at a position in a predetermined space, while the moving object is moving in the predetermined space; and an RFID reader which senses a second RFID tag included in the object, while the moving object is moving, wherein the control unit determines the position of the object as the position of the moving object calculated at a point of time when the second RFID tag is sensed.

According to another aspect of the present invention, there is provided an apparatus for detecting a position, wherein the apparatus detects a position of an object using a moving object, the apparatus including: a user input unit which receives input information about the object from a user; an RFID reader which senses an RFID tag included in the object, while the moving object is moving; and a control unit which informs the user that the object is detected, if information stored in the sensed RFID tag corresponds to the received input information.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Figure 1:
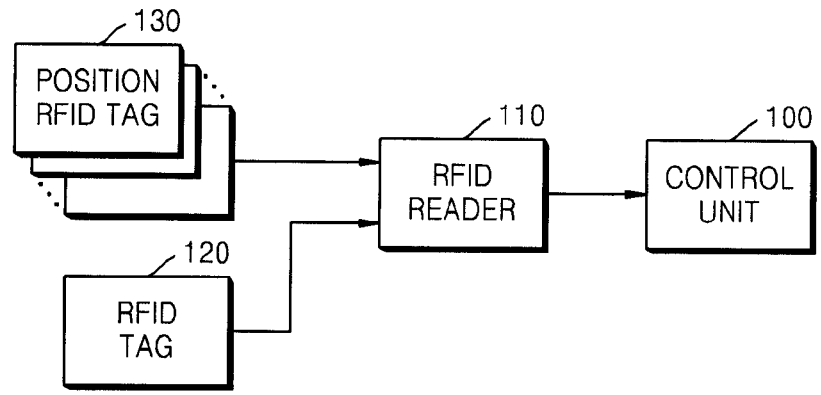
FIG. 1 is a block diagram of an apparatus for detecting a position according to an exemplary embodiment of the present invention.

FIG. 1 is a block diagram of an apparatus for detecting a position according to an exemplary embodiment of the present invention.

Referring to FIG. 1, the apparatus for detecting a position includes a control unit 100, and a radio frequency identification (RFID) reader 110. The apparatus for detecting a position can be installed in a moving object such as a robotic vacuum cleaner or a mobile robot.

The control unit 100 calculates a current position of a moving object. A method of calculating the position can be a mixture of an RFID method and an odometry method.

First, the RFID method measures an absolute position, where a plurality of position RFID tags 130 having information on a respective unique position is installed on a floor in a space that is to be searched, and the moving object senses the position RFID tags 130 installed on the floor by using the RFID reader 110 while the moving object moves around the floor and reads the information on the respective unique position, thereby determining the current position of the moving object.

Here, the position RFID tags 130 do not require a power supply, since the position RFID tags 130 use a passive mode. In this RFID mode, an accuracy in detecting a position is determined according to a distribution density of the position RFID tags 130. However, if the distribution density is low, it is difficult to sense an accurate position, whereas if the distribution density is high, an error may occur when reading a unique number of a position RFID tag 130 because of interference between RF signals output from the position RFID tags 130. Thus, detecting a position may be performed by using the odometry method while keeping the distribution density of the position RFID tags 130 in an appropriate range.

Secondly, the odometry method measures a relative position. Speed information is obtained by using an odometer or a wheel sensor, an azimuth angle is obtained by using a magnetic sensor, and information on a traveling distance and a direction from an initial position to a next position is calculated, thereby sensing a position and a direction of the apparatus for detecting a position.

However, in order that the control unit 100 combines the RFID method and the odometry method to calculate a position, it is necessary to match RFID coordinates that are absolute coordinates, and odometry coordinates that are relative coordinates. In order to match the coordinates, whenever the RFID reader in the apparatus for detecting a position obtains unique position information from a position RFID tag 130, a method of matching an origin of the odometry coordinates to the obtained unique position information may be used. For example, if the origin of the odometry coordinates is at x along the x-axis and at y along the y-axis with a rotation angle of $\theta$ at a point of time when the unique position information is obtained from a position RFID tag 130, the coordinates can be matched by calculating values of x, y, and $\theta$ and adjusting the origin by $\Box$x along the X-axis, $\Box$y along the Y-axis, and a rotation of the origin by $\Box\theta$.

In order for the control unit 100 to detect an absolute position, the RFID reader 110 senses a position RFID tag 130 installed on a floor having information on a unique position, receives the information on the unique position stored in the position RFID tag 130, and provides the information to the control unit 100. The RFID reader 110 also senses an RFID tag 120 affixed to an object.

When the RFID reader 110 senses the RFID tag 120 affixed to the object, the control unit 100 determines a position of the object as the position of the moving object calculated from the control unit 100 at a point of time when the RFID tag 120 is sensed.

Figure 2:
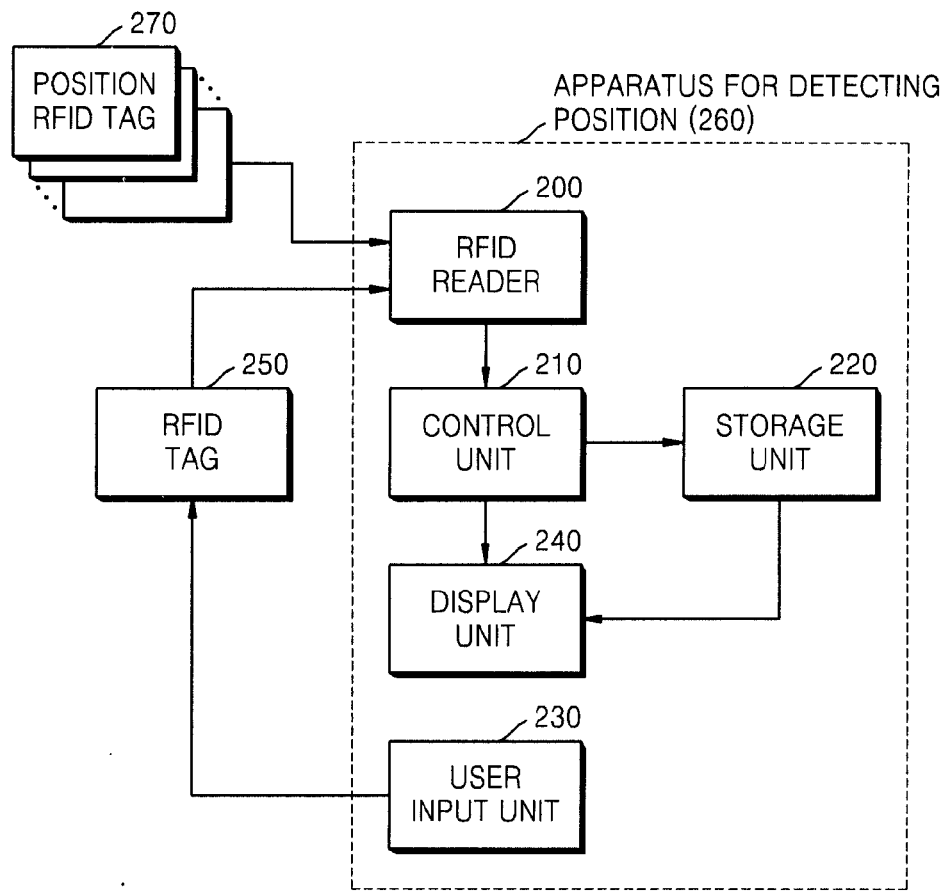
FIG. 2 is a block diagram of an apparatus for detecting a position according to another exemplary embodiment of the present invention.
Figures 3, 4A:
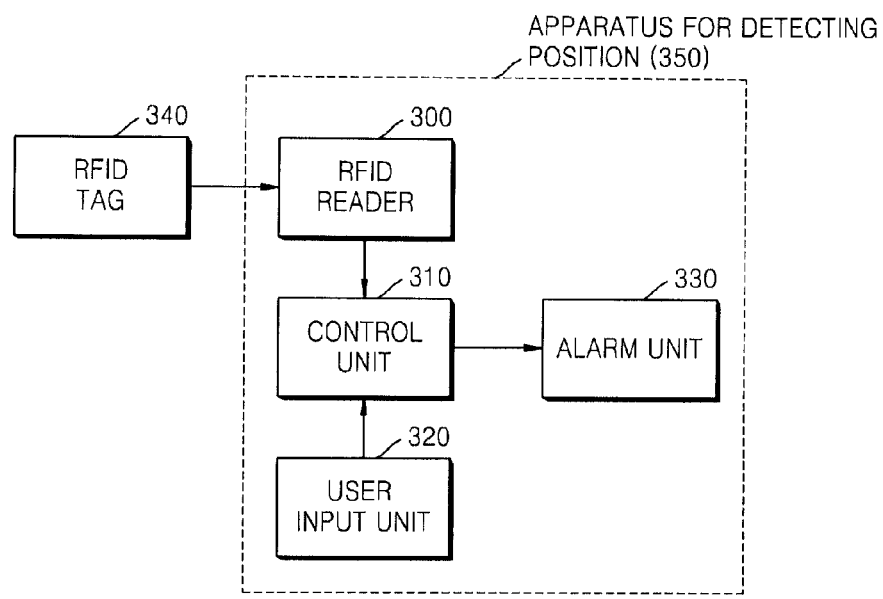
FIG. 3 is a block diagram of an apparatus for detecting a position according to another exemplary embodiment of the present invention.
FIGS. 4A through 4C illustrate a display unit of the apparatus for detecting a position shown in FIG. 2, according to another exemplary embodiment of the present invention.
Figure 4B:
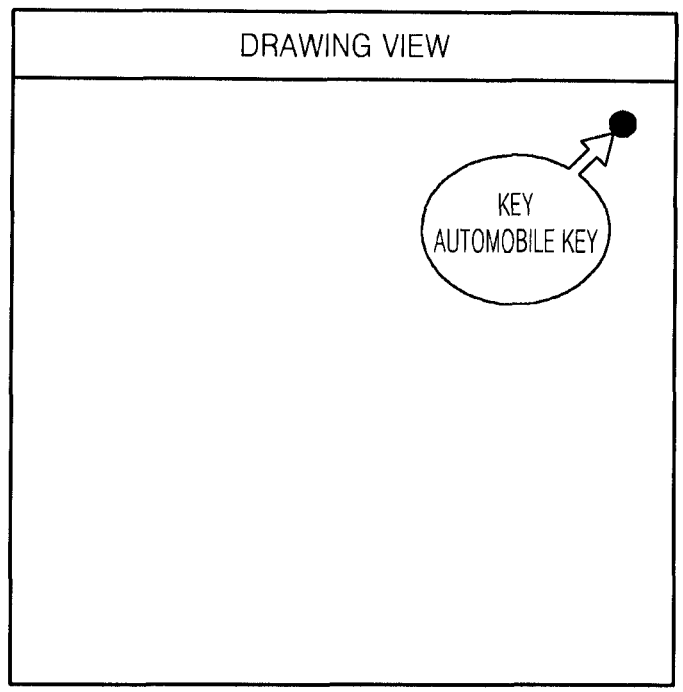
Figure 4C:
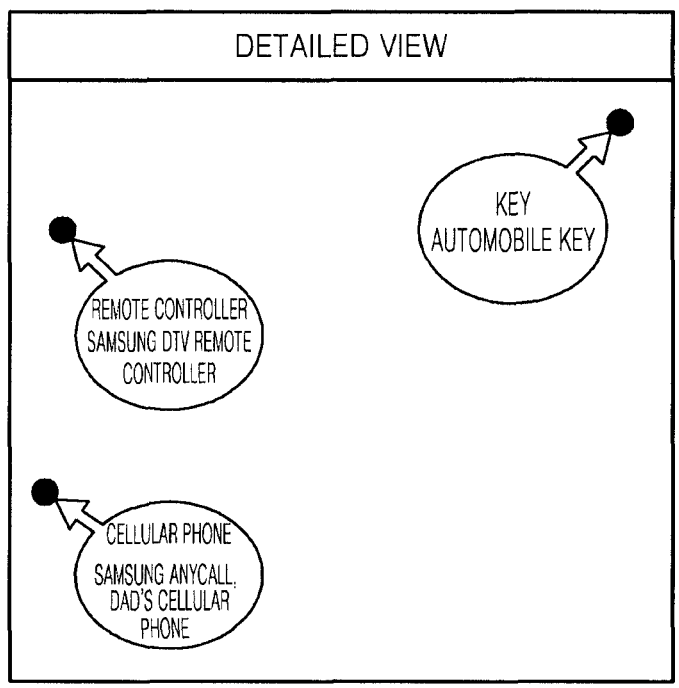

FIG. 2 is a block diagram of an apparatus 260 for detecting a position according to another exemplary embodiment of the present invention. Also, FIGS. 4A through 4C illustrate a display unit 240 of the apparatus for detecting a position shown in FIG. 2.

Referring to FIG. 2, the apparatus 260 for detecting a position according to an exemplary embodiment of the present invention includes an RFID reader 200, a control unit 210, a storage unit 220, a user input unit 230, and a display unit 240 and communicates with an RFID tag 250 affixed to an object. The apparatus 260 for detecting a position is affixed to a moving object.

First, the user input unit 230 receives additional input information about the object from the user, transmits the additional input information to the RFID tag 250, thereby ensuring storage of the additional information in the RFID tag 250. In other words, when the RFID reader 200 senses the RFID tag 250 during a registration mode of the apparatus for detecting a position, the user can input the additional information about the object through the user input unit 230, and thus desired additional information can be stored in the RFID tag 250. For example, when the RFID reader 200 senses the RFID tag 250 which is to be affixed to a key chain, the user can store additional information called 'automobile key chain' on the RFID tag 250 by inputting the additional information called 'automobile key chain' through the user input unit 230. Then the user affixes the RFID tag 250 to the automobile key chain.

The RFID reader 200 senses a position RFID tag 270 installed on the floor, receives the unique position information stored in the position RFID tag 270, and provides it to the control unit 210.

The control unit 210 calculates a current position of the moving object by using a mixture of the RFID method and the odometry method, based on the unique position information provided by the RFID reader 200.

While the moving object is moving, the RFID reader 200 senses the RFID tag 250 affixed to the object within a sensing range, receives information stored in the sensed RFID tag 250, and provides it to the control unit 210. Here, the information stored in the RFID tag 250 includes information granted during the manufacturing of the object and information provided by the user through the user input unit 230.

Also, the control unit 210 determines a position of the object as the position of the moving object calculated at a point of time when the RFID reader senses the RFID tag 250 affixed to the object, and generates information on the position of the object. The control unit 210, then, provides the information provided from the RFID reader 200 and the information on the position of the object to the storage unit 220.

The storage unit 220 stores a drawing of a room where the moving object is to move and information provided from the control unit 210. The storage unit 220 can be built into the apparatus 260 for detecting a position or installed in a home server, a television, or a computer, which are connected to the apparatus 260 for detecting a position through a network. Here, the drawing of the room is a drawing of places such as in a house or an apartment where the user is living, which may be downloaded through the Internet.

The display unit 240 displays the information stored in the storage unit 220 under the control of the control unit 210.

In this case, if a display mode is in an object-list view mode, the display unit 240 displays a list of all currently registered objects and information about the objects, as illustrated in FIG. 4A. Here, a list of objects registered without information on positions of the objects being stored in the storage unit 220 can be displayed by lowering the brightness of the color of the list so as to distinguish the list from a list of the objects in which information on positions of the objects is already stored. If the user selects an object which the user wants to find from among the displayed list of the objects, the control unit 210 extracts information and a position of the selected object from the storage unit 220, and displays the information and the position to the user by using the display unit 240, as illustrated in FIG. 4B. Here, the information about the object is information stored in an RFID tag affixed to the object including information such as 'key automobile key', 'remote controller Samsung television remote controller', or 'cellular phone Samsung Anycall, Dad's cellular phone'.

If the display mode is in a detailed view mode, the display unit 240 displays positions and information about corresponding objects in the list of all objects stored in the storage unit 220 in the drawing of the room, as illustrated in FIG. 4C.

FIG. 3 is a block diagram of an apparatus for detecting a position 350 according to another exemplary embodiment of the present invention.

Referring to FIG. 3, the apparatus for detecting a position 350 according to the present exemplary embodiment includes an RFID reader 300, a control unit 310, a user input unit 320, and an alarm unit 330. The apparatus for detecting a position 350 communicates with an RFID tag 340 affixed to an object, which is installed in a moving object.

First, the user input unit 320 receives input information about the object which the user wants to find. Here, the information includes information with which the object can be identified such as a name of the object.

The RFID reader 300 senses the RFID tag 340 affixed to the object through the RFID reader while the moving object is moving, receives information about the object stored in the sensed RFID tag 340, and provides it to the control unit 310.

The control unit 310 determines whether the object having the sensed RFID tag 340 affixed is the object which the user was looking for by comparing the information received by the RFID reader 300 with the information input through the user input unit 320.

Also, the control unit 310 informs the user that the object which he or she was looking for is found. At this time, the control unit 310 discontinues movement of the moving object, so the moving object can stop beside the object that is to be found. Also, the control unit 310 orders the alarm unit 330 to do ring an alarm, so the alarm unit 330 can inform the user that the input object is found by ringing the alarm.

Figure 5:
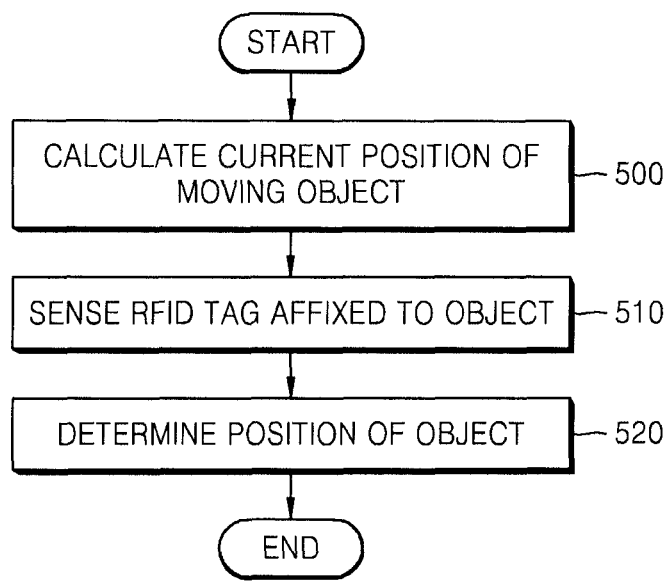
FIG. 5 is a flowchart of a method of detecting a position according to an exemplary embodiment of the present invention.

FIG. 5 is a flowchart of a method of detecting a position according to an exemplary embodiment of the present invention.

Referring to FIG. 5, a method of detecting a position according to an exemplary embodiment of the present invention includes operations performed by the apparatus for detecting a position illustrated in FIG. 1. The apparatus for detecting a position used in the present exemplary embodiment is installed in a moving object.

In operation 500, the apparatus for detecting a position calculates a current position of the moving object. Here, a method of calculating a position can be a mixture of the RFID method and the odometry method. First, the RFID method measures an absolute position, where a plurality of position RFID tags 130 having information on a respective unique position are installed on a floor in a space to be searched, and the moving object senses the position RFID 130 tags installed on the floor by using the RFID reader while the moving object is moving around the floor and reads the information on the respective unique position, thereby determining the current position of the moving object.

Here, the position RFID tags 130 do not require a power supply, since the position RFID tag 130 use a passive method. In this RFID method, accuracy in detecting a position is determined according to a distribution density of the position RFID tags 130. However, if the distribution density is low, it is difficult to sense an accurate position, whereas if the distribution density is high, an error may occur when reading a unique number of the position RFID tag 130 because of an interference between RF signals output from the plural position RFID tags 130. Thus, detecting a position may be performed by using the odometry method while keeping the distribution density of the position RFID tags 130 at an appropriate range.

Secondly, the odometry method measures a relative position. Speed information is obtained by using an odometer or a wheel sensor, an azimuth angle is obtained by using a magnetic sensor, and information on a traveling distance and a direction from an initial position to a next position is calculated, thereby sensing a position and a direction of the apparatus for detecting a position.

However, in order to calculate a position by combining the RFID method and the odometry method, it is necessary to match RFID coordinates that are absolute coordinates, and odometry coordinates that are relative coordinates. In order to match the coordinates, whenever the RFID reader in the apparatus for detecting a position obtains unique position information from a position RFID tag 130, a method of matching an origin of the odometry coordinates to the obtained unique position information may be used. For example, if the origin of the odometry coordinates is at x along the X-axis and at y along the Y-axis with a rotation angle of θ at a point of time when the unique position information is obtained from a position RFID tag 130, the coordinates can be matched by calculating values of x, y, and θ and adjusting the origin by □x along the x-axis, □y along the y-axis, and a rotation of the origin by □θ.

In operation 510, the apparatus for detecting a position senses an RFID tag 120 affixed to an object through the RFID reader.

In operation 520, the apparatus for detecting a position determines a position of the object as a position of the moving object calculated in operation 500 at a point of time when the RFID tag 120 is sensed in operation 510.

Figure 6:
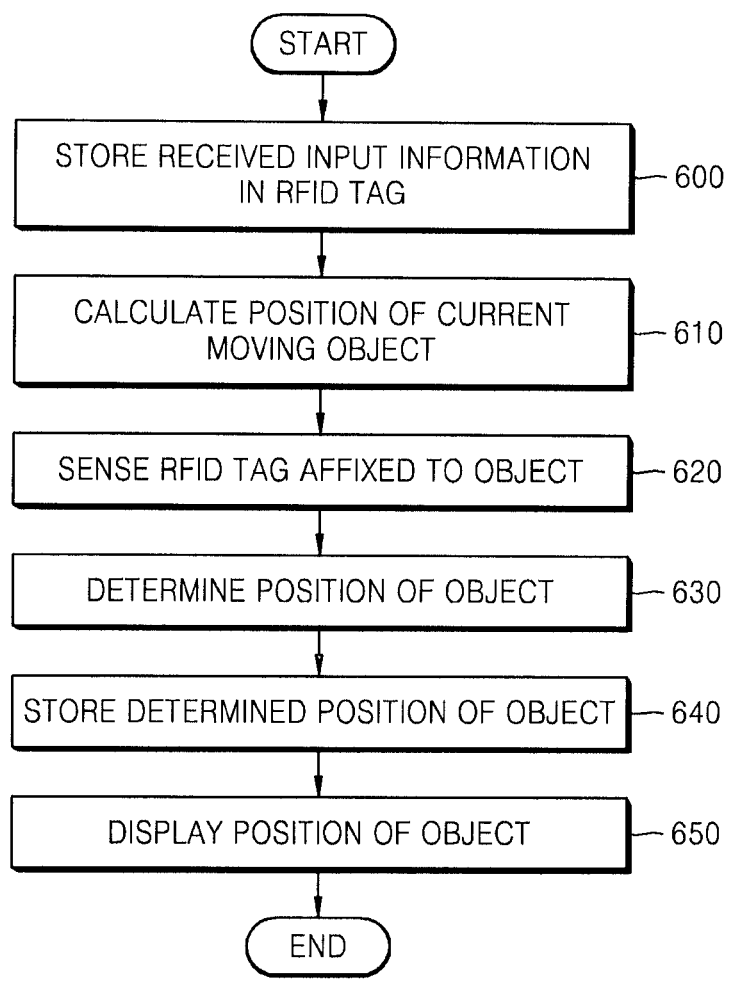
FIG. 6 is a flowchart of a method of detecting a position according to another exemplary embodiment of the present invention.

FIG. 6 is a flowchart of a method of detecting a position according to another exemplary embodiment of the present invention.

Referring to FIG. 6, a method of detecting a position according to the present exemplary embodiment includes operations performed by the apparatus 260 for detecting a position illustrated in FIG. 2. The apparatus for detecting a position according to the present exemplary embodiment is installed in a moving object.

In operation 600, the apparatus 260 for detecting a position receives additional input information about an object from the user, transmits the additional input information to an RFID tag 250, and thus the additional information can be stored in the RFID tag 250. In other words, when the RFID reader senses the RFID tag 250 during a registration mode of the apparatus 260 for detecting a position, the user can input the additional information about the object through the user input unit, and thus desiring additional information can be stored in the RFID tag 250. For example, when the RFID reader senses the RFID tag 250 which is to be affixed to a key chain, the user can store additional information called 'automobile key chain' on the RFID tag 250 by inputting the additional information called 'automobile key chain' by using the user input unit. Then the user affixes the RFID tag 250 to the automobile key chain.

In operation 610, the apparatus 260 for detecting a position calculates a current position of the moving object. When a position RFID tag 270, having information on a unique position and installed on the floor, is detected, the apparatus 260 for detecting a position receives the information on the unique position stored in the position RFID tag 270 detected by the RFID reader, and calculates the current position of the moving object by using a mixture of the RFID method and the odometry method. Here, a method of calculating the current position is the same as the method explained in operation 500 of FIG. 5.

In operation 620, the apparatus 260 for detecting a position senses the RFID tag 250 affixed to the object within the sensing range by using the RFID reader while moving, and receives information about the object stored in the sensed RFID tag 250. Here, the information about the object may be information stored in the RFID tag 250 by a manufacturer when manufacturing or may be information stored in the RFID tag 250 later by the user.

In operation 630, the apparatus 260 for detecting a position determines a position of the object as a position of the moving object calculated at a point of time when the RFID tag 250 is sensed in operation 620.

In operation 640, the apparatus 260 for detecting a position stores the position of the object, which was determined in operation 630, together with the information about the object, which was received in operation 620. Here, the position of the object and the information about the object may be stored in a memory built into the apparatus 260 for detecting a position or in a home-server, a television, or a computer, which are connected to the apparatus 260 for detecting a position through a network.

In operation 650, the apparatus 260 for detecting a position displays the position of the object and the information about the object stored in operation 640 to the user. Here, a detailed view mode and a drawing view mode may be provided for a display mode.

When the display mode is in an object-list view mode, a list of all currently registered objects and information about the objects are displayed, as illustrated in FIG. 4A. Here, a list of objects registered without the information on the positions of the objects being stored can be displayed by lowering the brightness of the color of the list so as to distinguish the list from the list of the objects in which information on the positions of the objects is already stored. When the user selects an object which the user wants to find from among the displayed list of the objects, information about the selected object and a position of the selected object are extracted and the information and the position of the selected object are displayed to the user as illustrated in FIG. 4B. Here, the position of the object is displayed according to the position information of the object, and the information about the object is displayed beside the object in the drawing of the room.

When the display mode is in a detailed view mode, positions and information about the corresponding object in the list of all objects stored in the drawing of the room are displayed, as illustrated in FIG. 4C.

Figure 7:
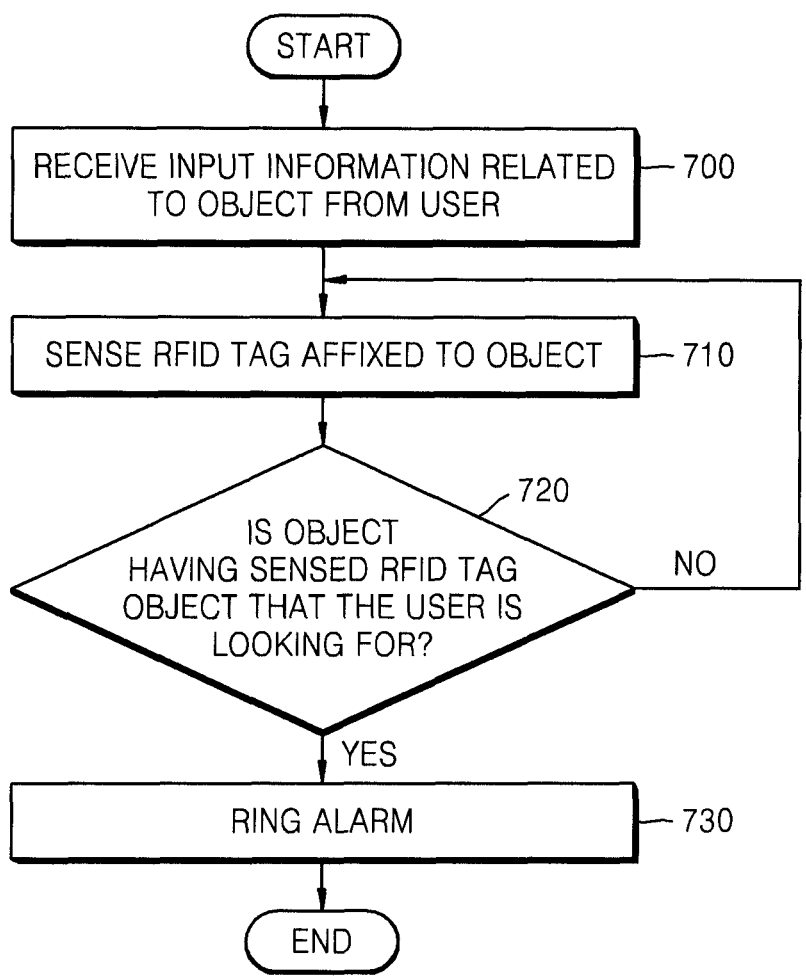
FIG. 7 is a flowchart of a method of detecting a position according to another exemplary embodiment of the present invention.

FIG. 7 is a flowchart of a method of detecting a position according to another exemplary embodiment of the present invention.

Referring to FIG. 7, the method of detecting a position according to the present exemplary embodiment includes operations performed by the apparatus for detecting a position 350 illustrated in FIG. 3. The apparatus for detecting a position 350 according to the present exemplary embodiment is installed in a moving object.

In operation 700, the apparatus for detecting a position 350 receives input information related to an object that is to be found, from a user. The information includes information with which the object can be identified such as a name of the object.

In operation 710, the apparatus for detecting a position 350 senses the RFID tag 340 affixed to the object by using the RFID reader 300 while the moving object is moving, and receives the information about the object stored in the sensed RFID tag 340.

In operation 720, the apparatus for detecting a position 350 determines whether the object having the sensed RFID tag 340 affixed is the object that the user is looking for, by comparing the information about the object received in operation 710 with the information input in operation 700.

In operation 730, if it is determined that the object in operation 720 is the object that the user was looking for, the apparatus for detecting a position 350 informs the user that the object which the user was looking for is found. At this time, the apparatus for detecting a position 350 discontinues movement of the moving object, so the moving object can stop beside the object that was found. Also, the apparatus can inform the user that the input object is found by ringing an alarm.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, a method and apparatus for detecting a position of an object using radio frequency identification (RFID) enables a user to easily find a position of an object having an RFID tag by calculating a position of a moving object using position RFID tags installed at particular positions in a predetermined space while the moving object is moving, sensing the RFID tag included in the object, determining the position of the object as the position calculated at a point of time when the RFID tag included in the object is sensed, and displaying the determined position.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of detecting a position of an object using an autonomous moving object, the method comprising:
   receiving a user selection of a displayed object, the user selection operable to locate the displayed object from among a list of objects displayed on a display unit in a first view mode;
   calculating a position of the autonomous moving object using a first radio frequency identification (RFID) tag installed at a position in a predetermined space;
   storing, by a user input unit, information describing the object in a second RFID tag included in the object, wherein the information describing the object is input by a user during a registration mode;

sensing the second RFID tag included in the object while the autonomous moving object is moving relative to the object;

determining the position of the object as the position of the autonomous moving object calculated at a point of time when the second RFID tag is sensed; and displaying, on the display unit in a second view mode, the stored information describing the object at a position next to the displayed object on the display unit based on the user selection, wherein the user input unit and the display unit are disposed in the moving object, and wherein the determining the position of the object comprises matching RFID coordinates with odometry coordinates, the odometry coordinates comprising a position along an X-axis, a position along a Y-axis, and a rotation angle of θ at a point in time when the RFID coordinates are obtained from the first RFID tag.

2. The method of claim 1, wherein at least one of the calculating the position of the autonomous moving object and the sensing the second RFID tag is performed while the autonomous moving object is moving in the predetermined space.

3. The method of claim 1, further comprising receiving the information stored in the second RFID tag when the second RFID tag is sensed, wherein the displaying the stored information describing the displayed object comprises displaying the determined position of the object and the received information.

4. A method of detecting a position of an object using an autonomous moving object, the method comprising:

storing, by a user input unit, information describing the object in a RFID tag included in the object, wherein the information describing the object is input by a user during a registration mode;

receiving a user selection of a displayed object, the user selection operable to locate the I displayed object from among a list of objects displayed on a display unit in a first view mode;

sensing the RFID tag included in the object and receiving the information stored in the RFID tag when the RFID tag is sensed while the autonomous moving object is moving;

providing an indication that the object is detected if the information stored in the sensed RFID tag corresponds to the received input information;

discontinuing movement of the autonomous moving object if the information stored in the sensed RFID tag corresponds to the received input information, and displaying, on the display unit in a second view mode, the stored information describing the object at a position next to the displayed object on the display unit based on the user selection, wherein the user input unit is disposed in the moving object, and wherein a position of the displayed object is calculated by matching RFID coordinates with odometry coordinates, the odometry coordinates comprising a position along an X-axis, a position along a Y-axis, and a rotation angle of θ at a point in time when the RFID coordinates are obtained from a second RFID tag installed at a position in a predetermined space.

5. The method of claim 4, wherein the indication is ringing an alarm.

6. An apparatus for detecting a position of an object using an autonomous moving object, the apparatus comprising:

a control unit which calculates a position of the autonomous moving object using a first radio frequency identification (RFID) tag installed at a position in a predetermined space, while the autonomous moving object is moving in the predetermined space;

a user input unit which receives information describing the object from a user and stores the information in a second RFID tag, during a registration mode, the user input unit further configured to receive a user selection of a displayed object, the user selection operable to locate the displayed object from among a list of objects displayed on the display unit in a first view mode;

an RFID reader which senses the second RFID tag included in the object, while the autonomous moving object is moving relative to the object; and a display unit which displays the received information describing the object at a position next to the displayed object on the display unit based on the user selection in a second view mode, wherein the control unit determines the position of the object as the position of the autonomous moving object calculated at a point of time when the second RFID tag is sensed, wherein the user input unit and the display unit are disposed in the autonomous moving object, and wherein the control unit calculates the position of the object by matching RFID coordinates with odometry coordinates, the odometry coordinates comprising a position along an X-axis, a position along a Y-axis, and a rotation angle of θ at a point in time when the RFID coordinates are obtained from the first RFID tag.

7. The apparatus of claim 6, wherein the RFID reader receives the information stored in the second RFID tag when the second RFID tag is sensed.

8. The apparatus of claim 6, wherein the autonomous moving object is a robotic vacuum cleaner.

9. An apparatus for detecting a position, wherein the apparatus detects a position of an object using an autonomous moving object, the apparatus comprising:

a user input unit which stores information describing the object in a RFID tag included in the object and receives input information related to the object from a user, during a registration mode, the user input unit further configured to receive a user selection of a displayed object, the user selection operable to locate the displayed object from among a list of objects displayed on the display unit in a first view mode;

an RFID reader which senses an RFID tag included in the object and receives the information stored in the RFID tag when the RFID tag is sensed, while the autonomous moving object is moving;

a control unit which informs the user that the object is detected if the information stored in the sensed RFID tag corresponds to the received input information, and a display unit which displays the received information describing the object at a position next to the displayed object on the display unit based on the user selection in a second view mode, wherein the control unit discontinues movement of the moving object if the information stored in the sensed RFID tag corresponds to the received input information, wherein the user input unit is disposed in the moving object, and wherein a position of the displayed object is calculated by matching RFID coordinates with odometry coordinates, the odometry coordinates comprising a position along an X-axis, a position along a Y-axis, and a rotation angle of θ at a point in time when the RFID coordinates are obtained from a second RFID tag installed at a position in a predetermined space.

10. The apparatus of claim 9, wherein the control unit informs the user that the object is detected by ringing an alarm.

11. The apparatus of claim 9, wherein the autonomous moving object is a robotic vacuum cleaner.

12. A non-transitory computer readable medium having embodied thereon a computer program for executing a method of detecting a position of an object using an autonomous moving object, the method comprising:
receiving a user selection of a displayed object, the user selection operable to locate the displayed object from among a list of objects displayed on a display unit in a first view mode;
calculating a position of the autonomous moving object using a first radio frequency identification (RFID) tag installed at a position in a predetermined space;
storing, by a user input unit, information describing the object in a second RFID tag included in the object, wherein the information describing the object is input by a user during a registration mode;
sensing the second RFID tag included in the object while the autonomous moving object is moving relative to the object;
determining the position of the object as the position of the autonomous moving object calculated at a point of time when the second RFID tag is sensed; and
displaying, on the display unit in a second view mode, the stored information describing the object at a position next to the displayed object on the display unit based on the user selection,
wherein the user input unit and the display unit are disposed in the autonomous moving object, and
wherein the determining the position of the object comprises matching RFID coordinates with odometry coordinates, the odometry coordinates comprising a position along an X-axis, a position along a Y-axis, and a rotation angle of θ at a point in time when the RFID coordinates are obtained from the first RFID tag.

13. The method of claim 1, wherein information describing the object comprises a name of the object.

14. The method of claim 1, wherein the position of the object is determined in a home environment.

* * * * *